United States Patent
Obuchi et al.

(10) Patent No.: US 8,619,679 B2
(45) Date of Patent: Dec. 31, 2013

(54) COMMUNICATION APPARATUS, TRANSMITTING METHOD AND RECEIVING METHOD

(75) Inventors: Kazuhisa Obuchi, Kawasaki (JP);
Yoshihiro Kawasaki, Kawasaki (JP);
Yoshiharu Tajima, Kawasaki (JP);
Yoshiaki Ohta, Kawasaki (JP);
Yoshinori Tanaka, Kawasaki (JP);
Katsumasa Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/344,085

(22) Filed: Jan. 5, 2012

(65) Prior Publication Data
US 2012/0099534 A1    Apr. 26, 2012

Related U.S. Application Data

(63) Continuation of application No. 12/182,125, filed on Jul. 29, 2008, now Pat. No. 8,094,609.

(30) Foreign Application Priority Data

Aug. 10, 2007    (JP) ................................ 2007-208765

(51) Int. Cl.
*H04L 1/18*    (2006.01)
(52) U.S. Cl.
USPC ......................................... 370/328; 714/749
(58) Field of Classification Search
None
See application file for complete search history.

(56) References Cited

U.S. PATENT DOCUMENTS

| 7,099,289 | B2 | 8/2006 | Varma | |
| 7,155,170 | B2 | 12/2006 | Miyoshi et al. | |
| 7,200,788 | B2 | 4/2007 | Hiraki et al. | |
| 2002/0054626 | A1 | 5/2002 | Inamura | |
| 2002/0167948 | A1* | 11/2002 | Chen | 370/392 |
| 2003/0115331 | A1* | 6/2003 | Xie et al. | 709/227 |
| 2003/0137948 | A1* | 7/2003 | Komandur et al. | 370/315 |
| 2003/0202500 | A1 | 10/2003 | Ha et al. | |
| 2004/0042492 | A1 | 3/2004 | Suzuki et al. | |
| 2004/0165543 | A1* | 8/2004 | Nakazawa | 370/252 |
| 2004/0190540 | A1* | 9/2004 | Miyake et al. | 370/428 |
| 2005/0147112 | A1 | 7/2005 | Sugaya | |

(Continued)

FOREIGN PATENT DOCUMENTS

| CN | 1780198 | 5/2006 |
| CN | 1925383 | 3/2007 |

(Continued)

OTHER PUBLICATIONS

English translation of R.O.C. Taiwanese Official letter for corresponding Taiwanese Patent Application No. 9712877 dated Feb. 6, 2012.

(Continued)

*Primary Examiner* — Min Jung
(74) *Attorney, Agent, or Firm* — Myers Wolin, LLC

(57) ABSTRACT

A receiving method and apparatus that performs receiving processing of data transmitted at timings of a predetermined interval. The method and apparatus includes transmitting a signal indicating that a data is successfully received when the data transmitted at $M^{th}$ timing according to the predetermined interval is successfully received; determining whether or not retransmission control processing is performed when the signal indicating that the data is successfully received is transmitted; and transmitting a signal indicating that the data is successfully received when the retransmission control processing is determined to be performed.

3 Claims, 12 Drawing Sheets

(56) References Cited

U.S. PATENT DOCUMENTS

| | | | |
|---|---|---|---|
| 2006/0034285 A1* | 2/2006 | Pirskanen et al. | 370/394 |
| 2006/0133273 A1 | 6/2006 | Julian et al. | |
| 2006/0203821 A1 | 9/2006 | Mizusawa et al. | |
| 2007/0086417 A1 | 4/2007 | Jang et al. | |
| 2007/0149196 A1 | 6/2007 | Choi et al. | |
| 2007/0183451 A1 | 8/2007 | Lohr et al. | |
| 2007/0286080 A1* | 12/2007 | Kim et al. | 370/236 |
| 2007/0291646 A1* | 12/2007 | Ohishi et al. | 370/236 |
| 2008/0010434 A1 | 1/2008 | Jitsukawa et al. | |
| 2009/0028107 A1 | 1/2009 | Julian et al. | |

FOREIGN PATENT DOCUMENTS

| | | |
|---|---|---|
| CN | 1926795 | 3/2007 |
| JP | 200169156 | 3/2001 |
| JP | 2001069174 | 3/2001 |
| JP | 2005-39601 | 2/2005 |
| JP | 2005-523669 | 8/2005 |
| JP | 2006-253980 | 9/2006 |
| TW | 200637234 | 10/2006 |
| WO | 2005/064839 | 7/2005 |
| WO | 2006/061911 | 6/2006 |

OTHER PUBLICATIONS

United States Patent and Trademark Office "Non-Final Office Action" issued for corresponding U.S. Appl. No. 12/182,125, dated May 31, 2011.
3GPPTS36.212 V1.3.0(Jul. 2007) Technical Specification Group Radio Access Network; Mulyiplexing and Channel Coding (Release 8), Jul. 2007.
3GPPTS25.212 V7.5.0(May 2007) Technical Specification Group Radio Access Network; Mulyiplexing and Channel Coding (FDD) (Release 7), May 2007.
3GPPTS25.321 V7.5.0(Jun. 2007) Technical Specification Group Radio Access Network; Medium Access Control (MAC) Protocol Specification (Release 7), Jun. 2007.
Korean Patent Office "Written Argument Submission Notification" with English translation for corresponding Korean Patent Application No. 10-2008-77923, submission date Apr. 22, 2010.
Australian Patent Office "Examiner's First Report" for corresponding Australian Patent Application No. 2008203519, dated Mar. 11, 2010.
Office Action issued for corresponding Taiwanese Patent Application No. 97128777, dated Jan. 10, 2012, with English summary and partial English translation.
Office Action issued for corresponding Canadian Patent Application No. 2,638,391, dated Jan. 16, 2013.
Notice of Rejection issued for corresponding Japanese Patent Application No. 2012-006613, dispatched May 21, 2013, with English translation.
Extended European search report issued for corresponding European patent application No. 08161932.2, dated Jul. 31, 2013.
First Notification of Office Action issued for corresponding Chinese Patent Application No. 201110225714.9, issued Jul. 17, 2013, with English translation.
Notice of Rejection issued for corresponding Japanese Patent Application No. 2012-006613, dispatched Aug. 13, 2013, with English translation.
Alcatel-Lucent; "Interaction of DRX and downlink HARQ in LTE"; Agenda Item: 4.13; 3GPP TSG RAN WG2 Meeting #58; R2-071661; Kobe, Japan; May 7-11, 2007.

* cited by examiner

COMMUNICATION APPARATUS, TRANSMITTING METHOD AND RECEIVING METHOD

CROSS REFERENCE TO RELATED APPLICATION

The present application is a continuation of U.S. application Ser. No. 12/182,125, filed Jul. 29, 2008, which claims the benefit of priority of prior Japanese Patent Application No.2007-208765, filed on Aug. 10, 2007, the contents of each are herein wholly incorporated by reference.

BACKGROUND

1. Field

An aspect of the invention is related to communication apparatuses including a transmitting apparatus and a receiving apparatus, a transmitting method, and a receiving method for transmitting/receiving wireless signals.

2. Description of the Related Art

In wireless communication systems including a mobile communication system, wireless signals are transmitted to a receiving apparatus from a transmitting apparatus. Packet data or the like is an example of the wireless signals. There are various data which is stored in a data part of the packet data. The data is not limited to text data and image data, but may include audio data or the like. If the wireless signals are not transmitted continuously, the transmission of the wireless signal is generally performed at a predetermined interval. For example, the transmission is performed every 20 ms.

However, there is no guarantee that the receiving apparatus can successfully receive the wireless signal even though the transmitting apparatus transmits the wireless signal. That is, a transmit signal is influenced by a propagation channel (path) (e.g., a fading channel) because the transmission and reception are performed wirelessly. Accordingly, a receive signal that the receiving apparatus obtains by receiving the transmit signal may not be correct. The transmit signal can be error-correcting coded, and it is possible to generate an appropriate receive signal by error-correct encoding in the receiving apparatus. However, the error may not be corrected completely depending on the extent of the error, so that the receiving apparatus may not obtain the appropriate receive signal.

In consideration of the above descried matter, there is a technology for performing a retransmission from the transmitting apparatus by determining reception result of the transmit signal in the receiving apparatus and feeding back the reception result to the transmitting apparatus.

FIG. 1 shows a known method of data transmitting/receiving processing in which the retransmission control is introduced.

As described in FIG. 1, the transmitting apparatus transmits the data (e.g., audio packet data) in turns every 20 ms. The receiving apparatus attempts to receive the transmitted data. Then the receiving apparatus transmits an ACK signal when the data is successfully received. The transmitting apparatus recognizes that the transmission was performed successfully if the ACK signal is received and then transmits other transmit signal (e.g., a next transmit signal which is to be transmitted to the same receiving apparatus) at next transmit timing. However, as described in FIG. 1, when the receiving apparatus could not receive the data successfully since a third transmission became an error because of the influence of the wireless channel, the receiving apparatus transmits a NACK signal. The transmitting apparatus recognizes that the transmission was not performed successfully if the NACK signal is received and then performs the retransmission. Thus, the receiving apparatus further receives the retransmitted data. When the reception of the retransmission is successful, an ACK signal is transmitted from the receiving apparatus and then next data is transmitted from the transmitting apparatus at the next transmit timing. Accordingly, even if a first transmission fails, it is possible that one or more than one retransmission makes the transmission a success by introducing the retransmission control.

As for the above described retransmission control are described in 3GPP TS25.212, 3GPP TS25.321 and 3GPP TS36.212.

As described previously, introducing the retransmission control increases chances of successful data transmission from the transmitting apparatus to the receiving apparatus. However, it is difficult to perform a control such as to perform an intermittent reception simply at a predetermined interval, because the retransmission control is performed (inserted).

SUMMARY

It is an object of the present invention to reduce waste in a reception operation and/or a transmission operation when retransmissions occur out of the predetermined interval because of the retransmission control.

According to an aspect of the invention, a communication apparatus that performs receiving processing of data transmitted at timings of a predetermined interval, the communication apparatus having a transmitting unit configured to transmit a signal indicating that a data is successfully received when the data transmitted at $M^{th}$ timing according to the predetermined interval is successfully received and a control unit configured to perform a control for providing a period in which other receiving processing different from the receiving processing is at least performed or a receiving process is not performed until when next $M+1^{th}$ timing comes according to the predetermined interval after the transmission of the signal or method used in the communication apparatus is utilized.

According to an aspect of the invention, a communication apparatus that performs receiving processing of data transmitted at timings of a predetermined interval, the communication apparatus having a transmitting unit configured to transmit a signal indicating that a data is not successfully received when the data is not successfully received at $M^{th}$ timing according to a predetermined interval and a control unit configured to perform a control for providing a period in which other receiving processing different from the receiving processing is at least performed or a receiving process is not performed until when next $M+1^{th}$ timing comes according to the predetermined interval after it is detected that retransmission control processing is not performed in response to the transmission of the signal indicating that the data is not successfully received or method used in the communication apparatus is utilized.

According to an aspect of the invention, a communication apparatus capable of performing a retransmission, the communication apparatus having a retransmission control unit configured to perform a retransmission when a response to new data is not received is received and when a signal indicating that the data is not successfully received is received, wherein the retransmission control unit does not perform an $N^{th}$ retransmission when a response to the $N^{th}$ retransmission is not received, but performs an $N+1^{th}$ retransmission when a response indicating that the $N^{th}$ retransmission is not successfully received is received or method used in the communication apparatus is utilized.

According to an aspect of the invention, a communication apparatus that performs receiving processing of data transmitted at timings of a predetermined interval, the communication apparatus having a transmitting unit configured to transmit a signal indicating that a data is successfully received when the data transmitted at $M^{th}$ timing according to the predetermined interval is successfully received and a control unit configured to determine whether or not a retransmission control processing is performed when the signal indicating that the data is successfully received is transmitted, wherein the control unit transmits a signal indicating that the data is successfully received when the retransmission control processing is performed or method used in the communication apparatus is utilized.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

Preferred embodiments of the present invention will be explained with reference to accompanying drawings.

[a] First Embodiment

When a transmitting apparatus transmits a wireless signal at a predetermined interval, a receiving apparatus can receive the wireless signal by performing a reception in response to the predetermined interval. It is possible to determine whether or not a transmission (a retransmission) is performed out of the interval based on the type of signal the receiving apparatus itself transmits. That is, the transmission (the retransmission) does not occur out of the interval if an ACK signal (type 1) is transmitted from the receiving apparatus, but the transmission (the retransmission) occurs out of the interval if a NACK signal (type 2) is transmitted from the receiving apparatus.

In this embodiment, therefore, when the receiving apparatus performing an intermittent reception control in response to a transmission interval transmits the NACK signal, the reception operation period has to be set to be longer comparing to the case when the ACK is transmitted. The period can be, for example, a period in which the wireless signal is transmitted by a retransmission (e.g., a first retransmission) and then received. If another NACK signal is transmitted in response to the retransmission, the period can be a period in which the wireless signal is transmitted by another retransmission (a second retransmission) and then received.

At the time of transmitting NACK signals, the power of a receiving unit is turned on all through the period corresponding to the transmission interval. At the time of transmitting ACK signals, the power of the receiving unit can be turned off when the reception is completed, which can reduce power consumption.

However, in a situation where it is assumed that a reception environment is not so good, such as the environment in which NACK signals are transmitted, the receiving unit may allocate equal to or more than ½ to ⅔ of the transmission interval to the period for receiving the retransmission and allocates the remaining ⅓ to ½ of the transmission interval to the period for measuring (search) a reception quality of signals from adjacent base stations. That is, a receiving processing unit can be controlled to perform other receiving processing.

Figure 1:
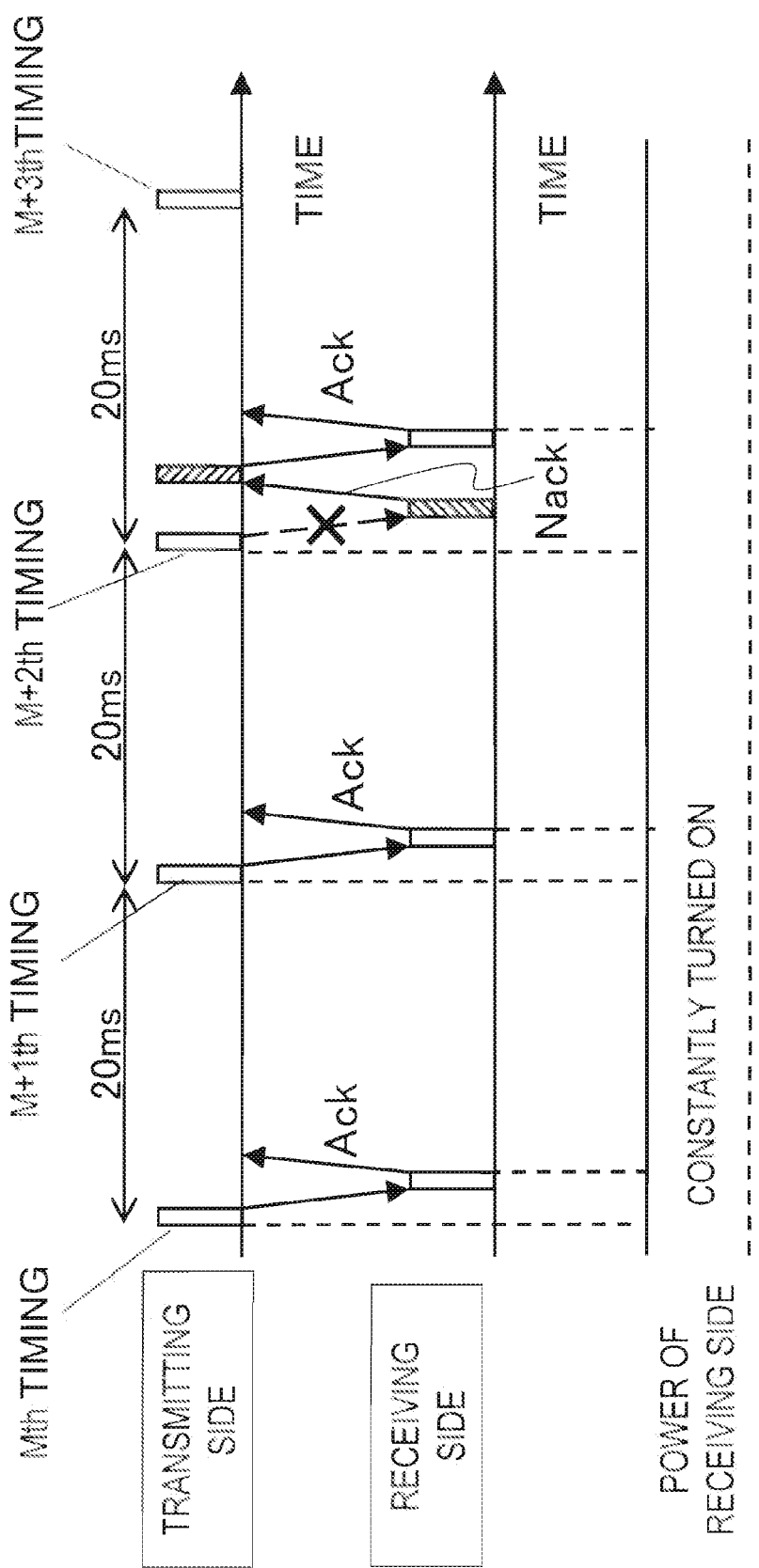
FIG. 1 illustrates a known method of data transmitting/receiving processing.
Figure 2:
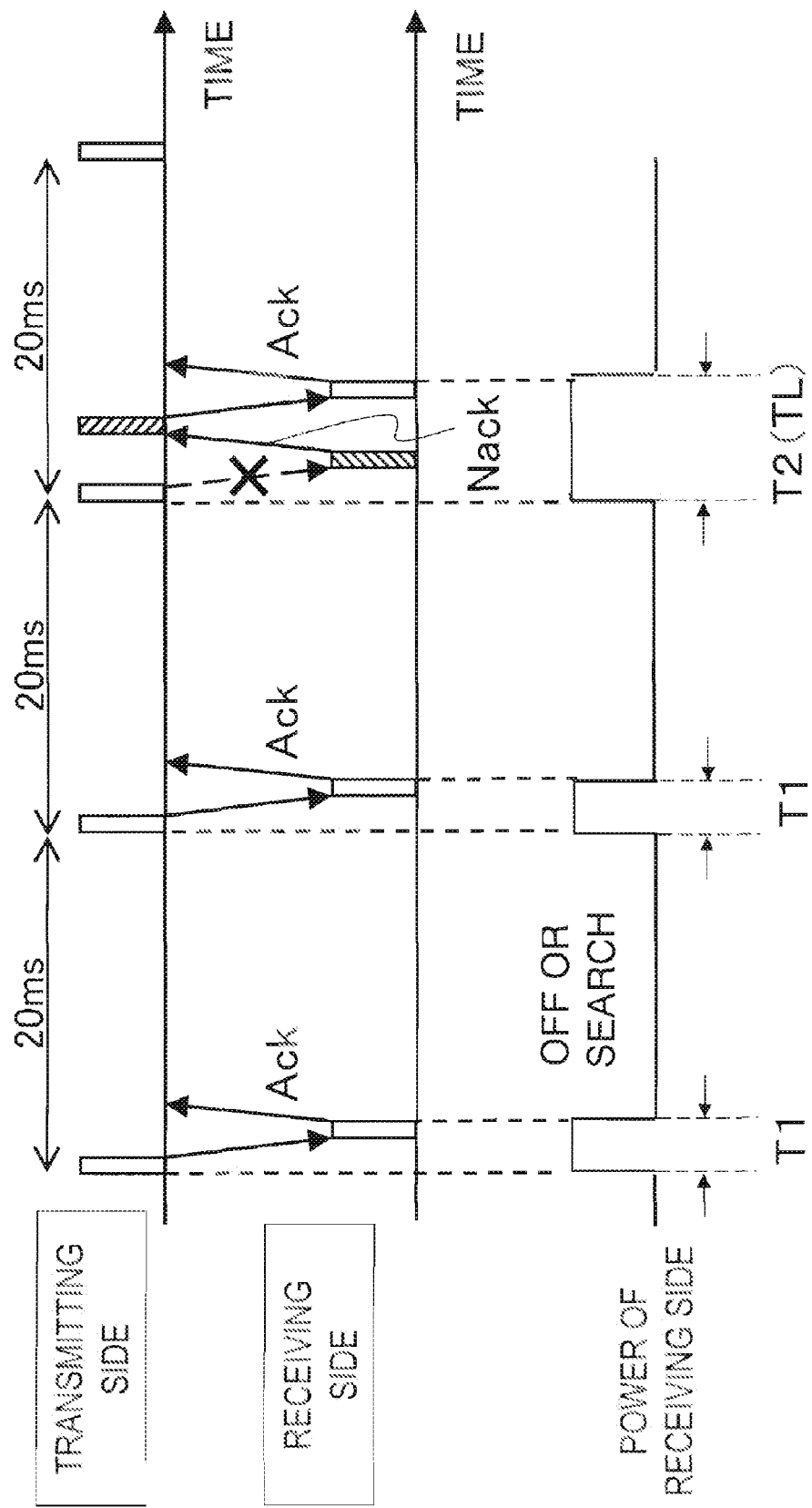
FIG. 2 illustrates a first example of transmitting/receiving processing.

FIG. 2 shows a first example of transmitting/receiving processing.

As described in FIG. 2, the transmitting apparatus transmits the data (e.g., audio packet data), for example, every 20 ms. The receiving apparatus performs the intermittent reception in response to this interval. When the data is successfully received and an ACK signal is transmitted, a predetermined period (T1) is allocated to the reception operation of receiving the data. When a NACK signal is transmitted, another predetermined period (T2 (T1<T2)) is allocated to the reception operation of receiving the data. The period T2 is a period in which at least one retransmission can be received. When a plurality of the retransmissions are performed, the period T2 can be set to a period TL in which a final retransmission can be received.

A second example is that the transmitting apparatus may not receive the NACK signal even though the receiving apparatus transmits the NACK signal. In such case, the retransmission is not performed. Thus, another NACK signal can be transmitted to expect another retransmission, but this requires a considerable time.

Therefore, when the retransmission is not successfully received even though the receiving apparatus transmits the NACK signal (or when the transmitting apparatus does not receive an advance notice of retransmission), the receiving apparatus can control the receiving unit not to perform the reception operation of receiving the data until the next periodic transmit timing comes. That is, for example, the power of the receiving unit can be turned off or the receiving unit can search for another transmitting unit as an out of the reception standby mode.

Figure 3:
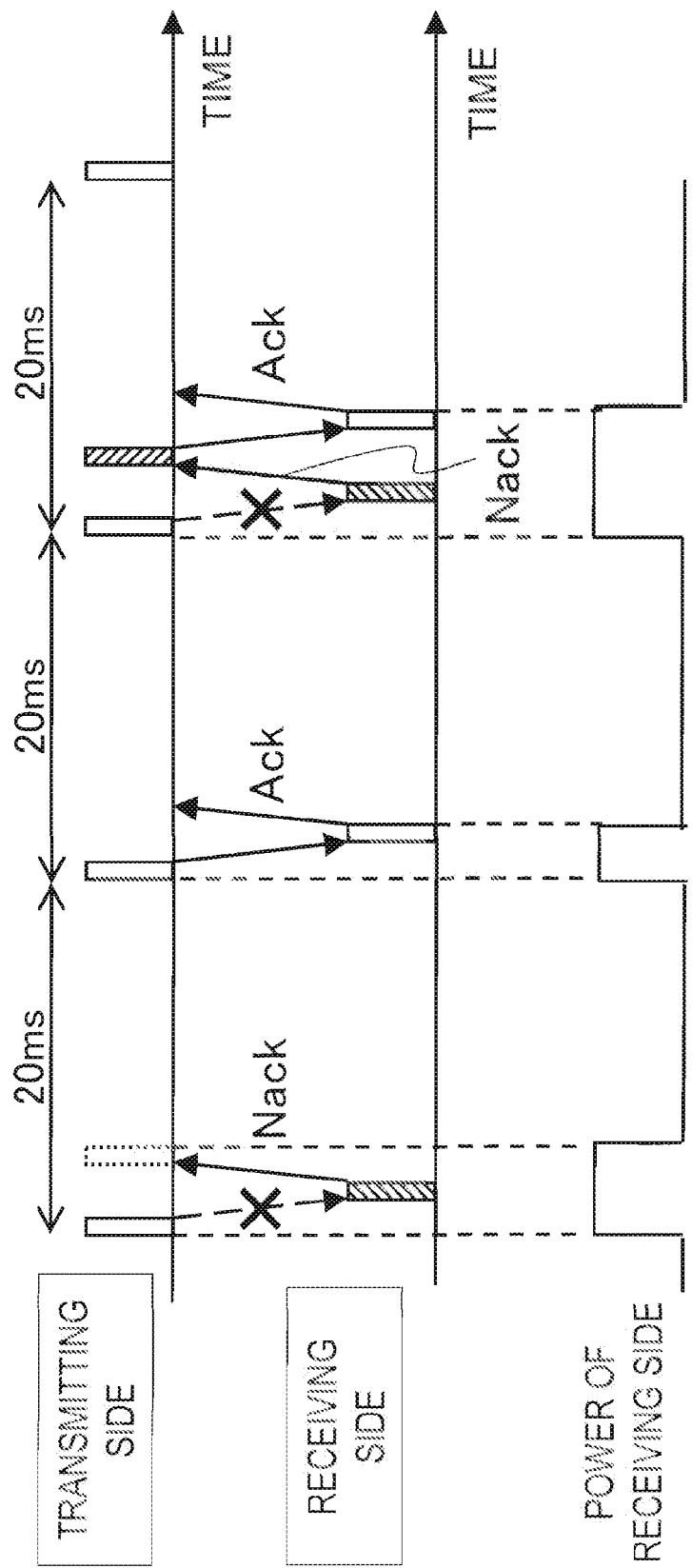
FIG. 3 illustrates a second example of transmitting/receiving processing.

FIG. 3 shows a second example of the transmitting/receiving processing.

As described in FIG. 3, when the receiving apparatus could not receive the first transmit signal, the receiving apparatus transmitted a NACK signal to attempt to receive the retransmission, but did not receive the retransmission (or did not receive an advance notice of retransmission). Thus, the receiving apparatus then puts the receiving unit out of a reception standby state of retransmit data. On the other hand, the receiving apparatus transmits the NACK signal to the transmitting apparatus because a third transmit signal was not received successfully. In this case, the retransmission is performed because the transmitting apparatus could receive the NACK signal. The receiving apparatus transmits an ACK signal because the receiving apparatus could receive the first retransmission, and puts the receiving unit out of the reception standby state of the retransmit data. The operation out of the reception standby state can be identical to that of the first example.

Basic control flows of the first and second examples according to the first embodiment are described above. A configuration of the receiving apparatus corresponding to the above described control will be described by using FIG. 4.

Figure 4:
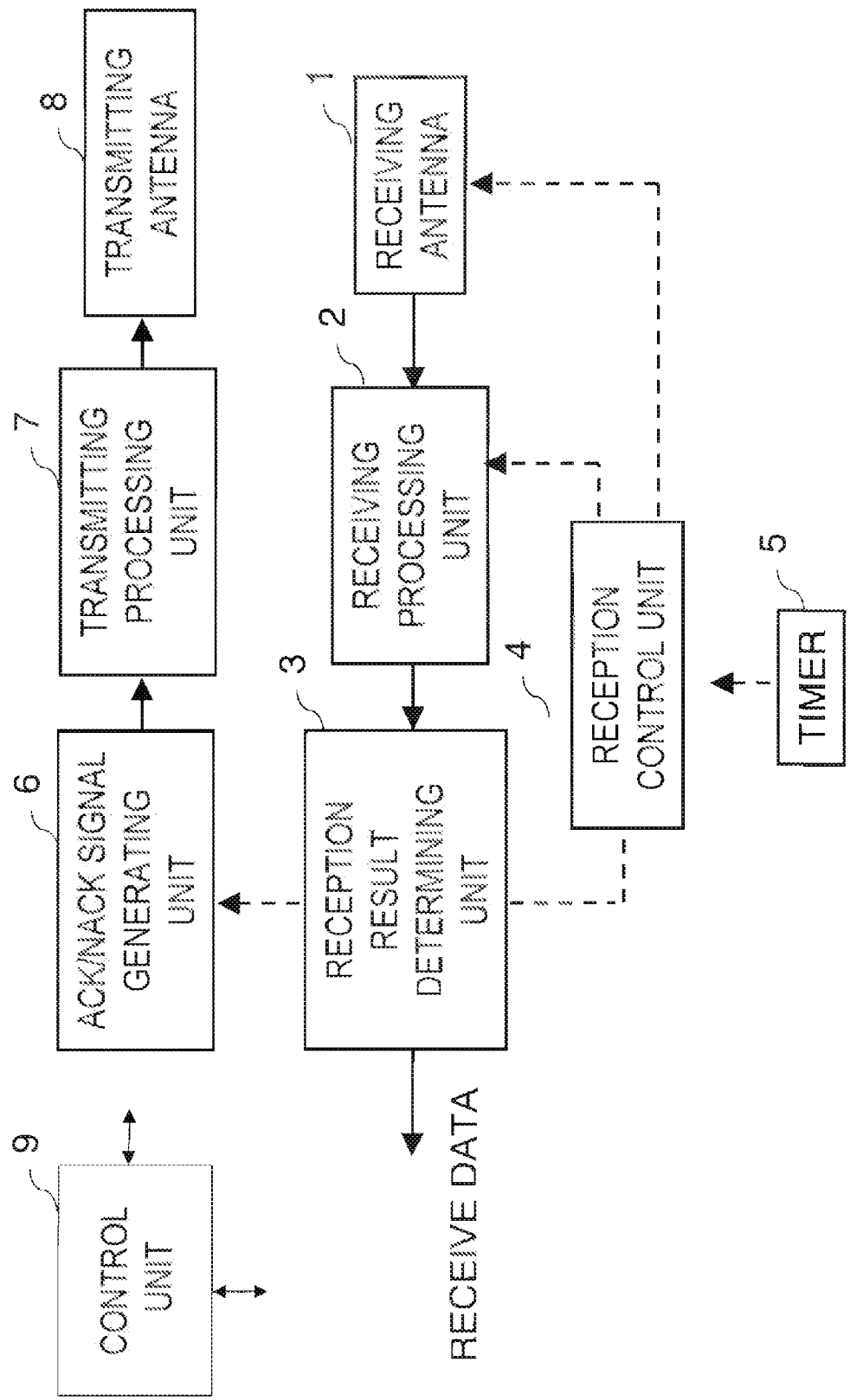
FIG. 4 illustrates a first example of a configuration of a receiving apparatus.

FIG. 4 shows a first example of a configuration of the receiving apparatus.

Numeral 1 indicates a receiving antenna. Numeral 2 indicates a receiving processing unit. Numeral 3 indicates a reception result determining unit. Numeral 4 indicates a reception control unit. Numeral 5 indicates a timer. Numeral 6 indicates an ACK/NACK signal generating unit. Numeral 7 indicates a transmitting processing unit. Numeral 8 indicates a transmitting antenna.

The receiving antenna 1 receives transmit signals transmitted periodically from the transmitting apparatus and transmit signals retransmitted from the transmitting apparatus. The receiving processing is performed on the signals which are received by the receiving antenna by the receiving processing unit 2 depending on transmission forms used for the transmission in order to obtain receive data by demodulating and decoding (error correcting decoding may be included). The transmission form can be included in the advance notice of transmission transmitted from the transmitting apparatus or can be presumed to be a form selected from predetermined forms. The receive data obtained by the receiving processing unit 2 is given to the reception result determining unit 3. Then it is determined whether or not the reception is performed successfully. For example, if the transmitting apparatus performs error-detection encoding processing (adding a CRC calculation result or the like) on the transmit data, an error detection is performed by using CRC calculation result and the error-detection result is given to the ACK/NACK signal generating unit 6. If the data is successfully received, the receive data is given to a received data processing unit on the left side which is not shown in the figure and then is displayed on a display, outputted as audio sound from a speaker, or outputted to an external unit as needed. Although the data can be discarded if the data is not successfully received, the data can be stored in a memory unit inside the reception result determining unit 3 in order to be combined with the receive data transmitted by a next retransmission. The receiving processing unit 2 can perform the decoding based on the combined data and can give the result to the reception result determining unit 3 (a so-called hybrid ARQ method).

If the reception result indicates that the data was successfully received, the ACK/NACK signal generating unit 6 outputs an ACK signal as a response signal. If the reception result indicates that the data was not successfully received, the ACK/NACK signal generating unit 6 outputs a NACK signal as a response signal. The transmitting processing unit 7 performs transmitting processing on the response signals (the ACK signal/the NACK signal) to convert it into wireless signals and then transmits the wireless signals from the transmitting antenna 8. The transmit timing of the response signal can come after a predetermined offset time passes the transmit timing of the packet.

The transmitting antenna and the receiving antenna can be a shared antenna by using a duplexer or the like. The reception control unit 4 controls each receiving unit based on timing signals outputted from the timer 5 (timing managing unit). Other units are controlled by a control unit 9.

Figure 5:
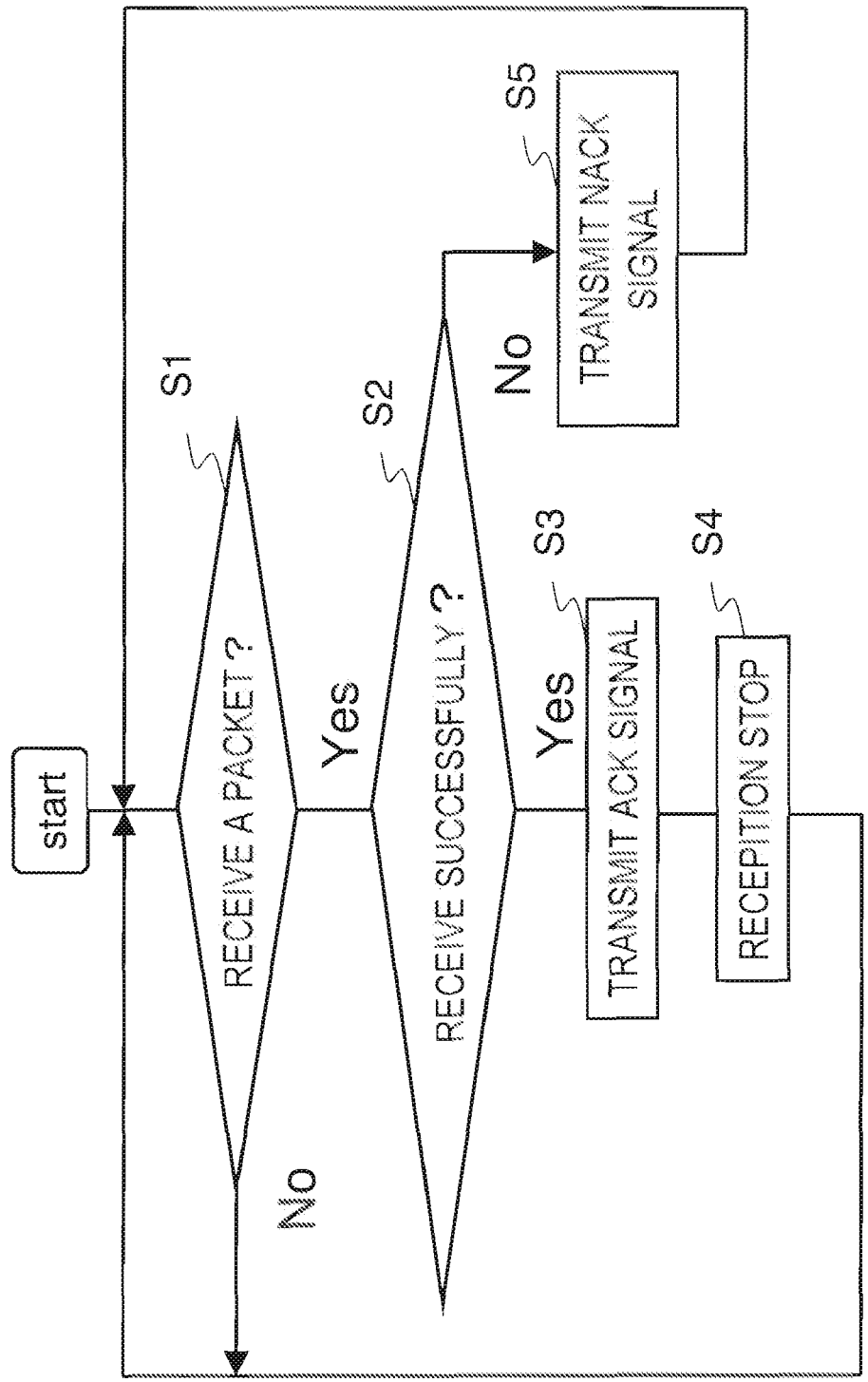
FIG. 5 illustrates an example of a control flow in the receiving apparatus.

FIG. 5 shows a first example of a control flow within the receiving apparatus. This control is performed mainly by a control of the reception control unit 4.

The reception control unit 4 controls to start the reception operation and determines whether or not the packet is received (step S1).

If the packet is received in step S1, the reception result determining unit 3 determines whether or not the packet is successfully received (step S2).

If the packet is successfully received, an ACK signal is generated by the ACK/NACK signal generating unit 6 and the ACK signal is transmitted from the transmitting processing unit 7 and the transmitting antenna 8 (step S3).

If the packet is not successfully received, on the other hand, a NACK signal is generated by the ACK/NACK signal generating unit 6 and the NACK signal is transmitted from the transmitting processing unit 7 and the transmitting antenna 8 (step S5). The reception control unit 4 puts the receiving processing unit 2 etc. in the reception standby state without turning off the power thereof, or the like, in order to receive a retransmit packet. After that, the process goes back to the determination of step S1.

If the ACK signal is received in step S3, receiving stop processing of the packet data is performed (step S4). As the receiving stop processing of the packet data, for example, the power of the receiving processing unit 2 or the like is turned off or the search of the other transmitting apparatuses may be conducted.

Then the reception control unit 4 controls the receiving processing unit 2 etc. at the next transmit timing to receive a next packet. The process goes back to the determination of step S1.

If it is determined that the packet is not received at the predetermined periodic transmit timing in the determination of step S1, it is determined whether or not the retransmit packet is received in step 1 without turning off the power of the receiving processing unit 2 just like the process after transmitting the NACK signal in step 5 (Step S1).

Figure 6:
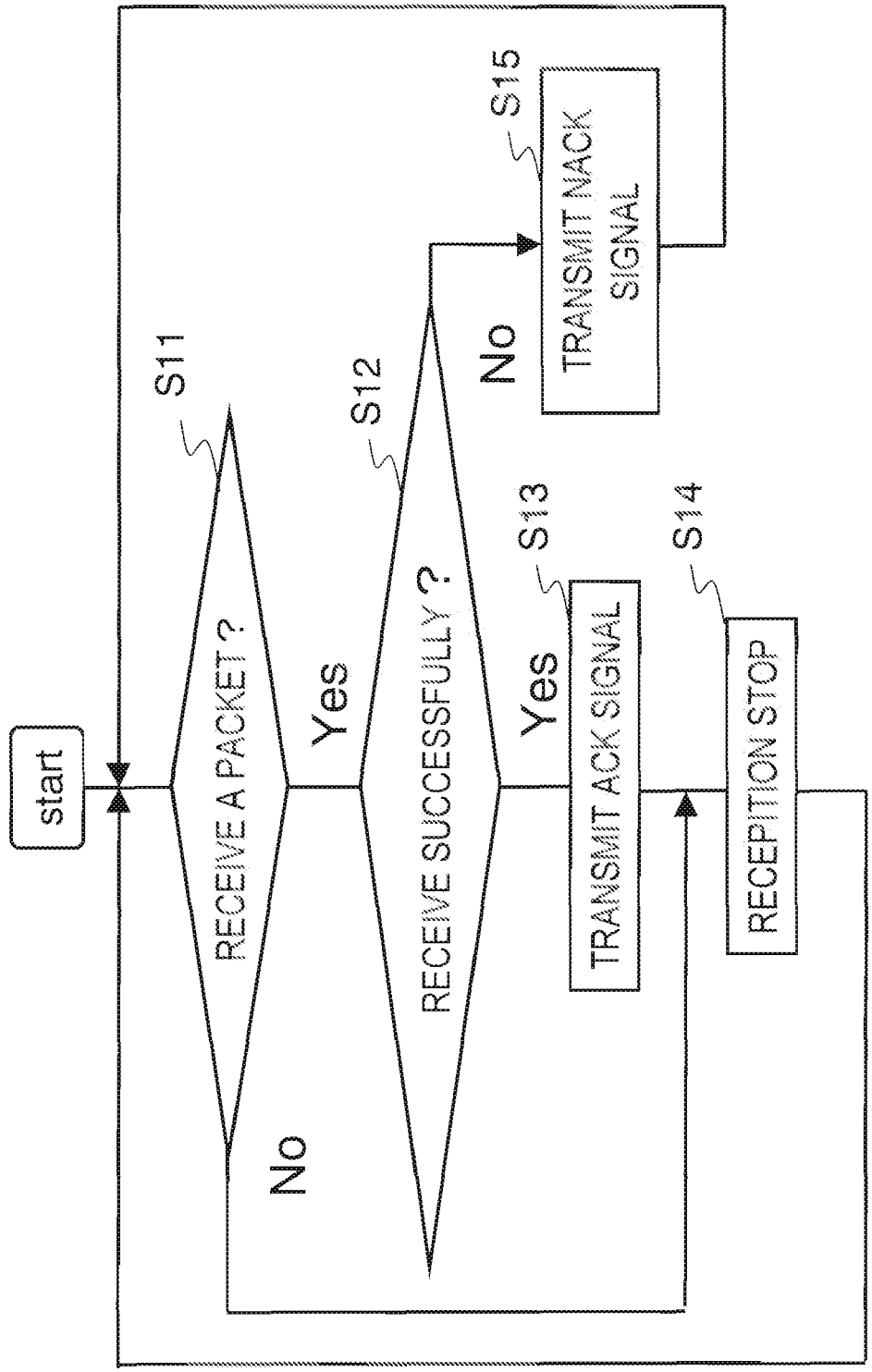
FIG. 6 illustrates another example of a control flow in the receiving apparatus.

FIG. 6 shows another example of a control flow within the receiving apparatus. This control is performed by the control of the reception control unit 4 or the like.

The reception control unit 4 controls to start the reception operation in response at the transmit timing and determines whether or not the packet is received (step S11).

If the packet is received in step S11, the reception result determining unit 3 determines whether or not the receive packet is received successfully (step S12).

If the packet is successfully received, an ACK signal is generated by the ACK/NACK signal generating unit 6 and is transmitted from the transmitting processing unit 7 and the transmitting antenna 8 (step S13).

If the packet is not successfully received, on the other hand, a NACK signal is generated by the ACK/NACK signal generating unit 6 and is transmitted from the transmitting processing unit 7 and the transmitting antenna 8 (step S15). The reception control unit 4 puts the receiving processing unit 2 etc. in the reception standby state without turning off the power thereof, or the like, in order to receive the retransmit packet. After that, the process goes back to the determination in step S11.

If the packet is not received in step S11 or the ACK signal is received in step S13, the receiving processing of the packet data is stopped (step S14). As the stop of the receiving processing of the packet data, for example, the power of the receiving processing unit 2 or the like is turned off or the search of the other transmitting apparatuses is conducted.

Then the reception control unit 4 controls the receiving processing unit 2 and the like at the next transmit timing to receive the next packet. The process goes to the determination of step S11.

[b] Second Embodiment

The transmitting apparatus can perform a retransmission control not only when the ACK signal is not received but also when the NACK signal is received.

Figure 7:
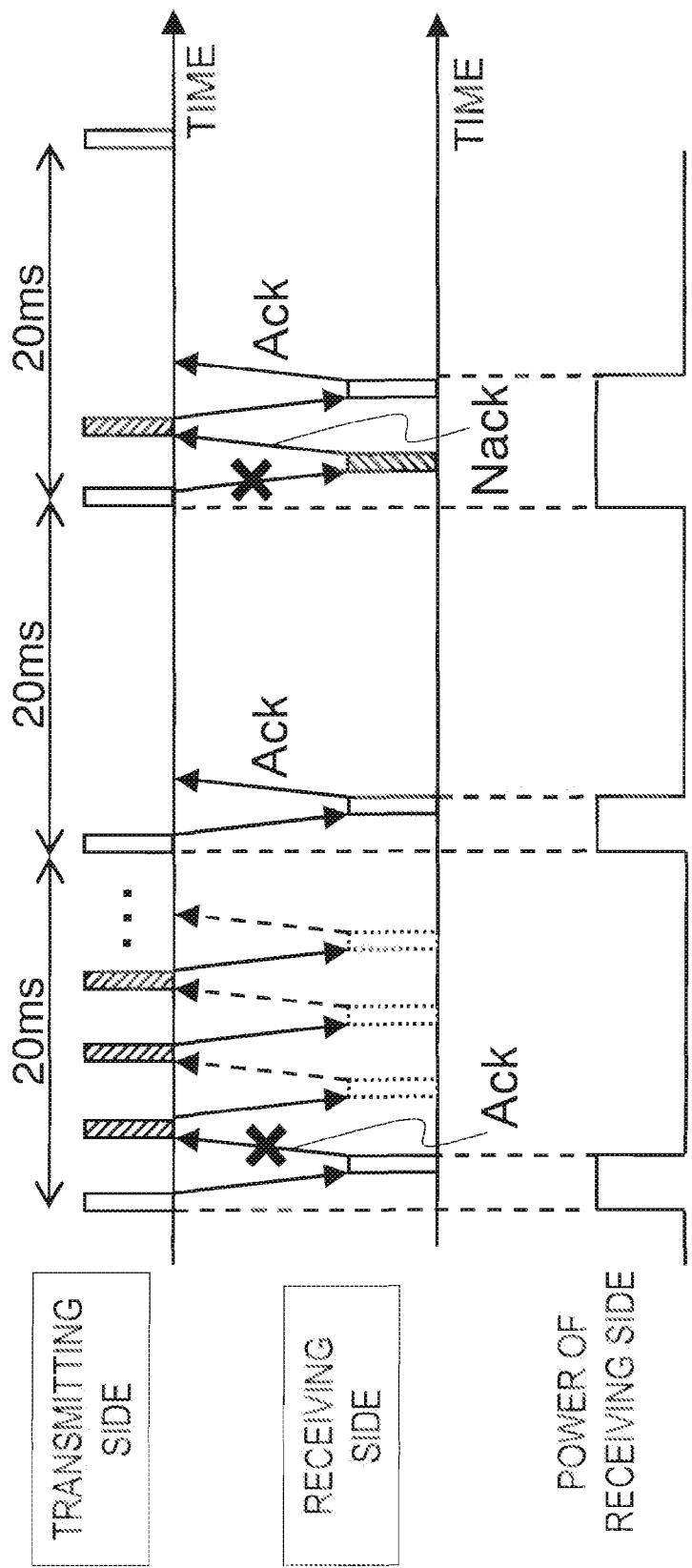
FIG. 7 illustrates a retransmission control of a case when a transmitting apparatus does not receive an ACK signal.

FIG. 7 shows the retransmission control when the transmitting apparatus does not receive the ACK signal.

As well as in the first embodiment, the transmitting apparatus transmits packets at the predetermined interval (20 ms). The first transmission was successful and the receiving apparatus transmitted an ACK signal. However, the transmitting apparatus could not receive the ACK signal successfully (or the transmitting apparatus incorrectly determined the ACK signal as a NACK signal). Accordingly, the transmitting apparatus performs a retransmission.

On the other hand, since the receiving apparatus transmitted the ACK signal, the retransmission is not expected and the receiving apparatus does not receive the retransmission. Therefore, the transmitting apparatus performs another retransmission because the receiving apparatus does not transmit any response signals (an ACK signal/a NACK signal) in response to the retransmission. After that, useless retransmissions are performed up to the maximum transmission number in vain until when the next transmit timing comes.

In this embodiment, the transmitting apparatus does not perform the next retransmission if the NACK signal is not received in response to the first retransmission. That is, the retransmission is performed not only when the NACK signal is received but also when the ACK signal is not received in response to the first retransmission. After the first retransmission, however, the retransmission is performed if the NACK signal is received, but the retransmission is not performed if the ACK/NACK signal is not received (no response case).

As a result, it is possible to reduce the useless retransmissions which are performed when the transmitting apparatus can not detect the ACK signal.

Figure 8:
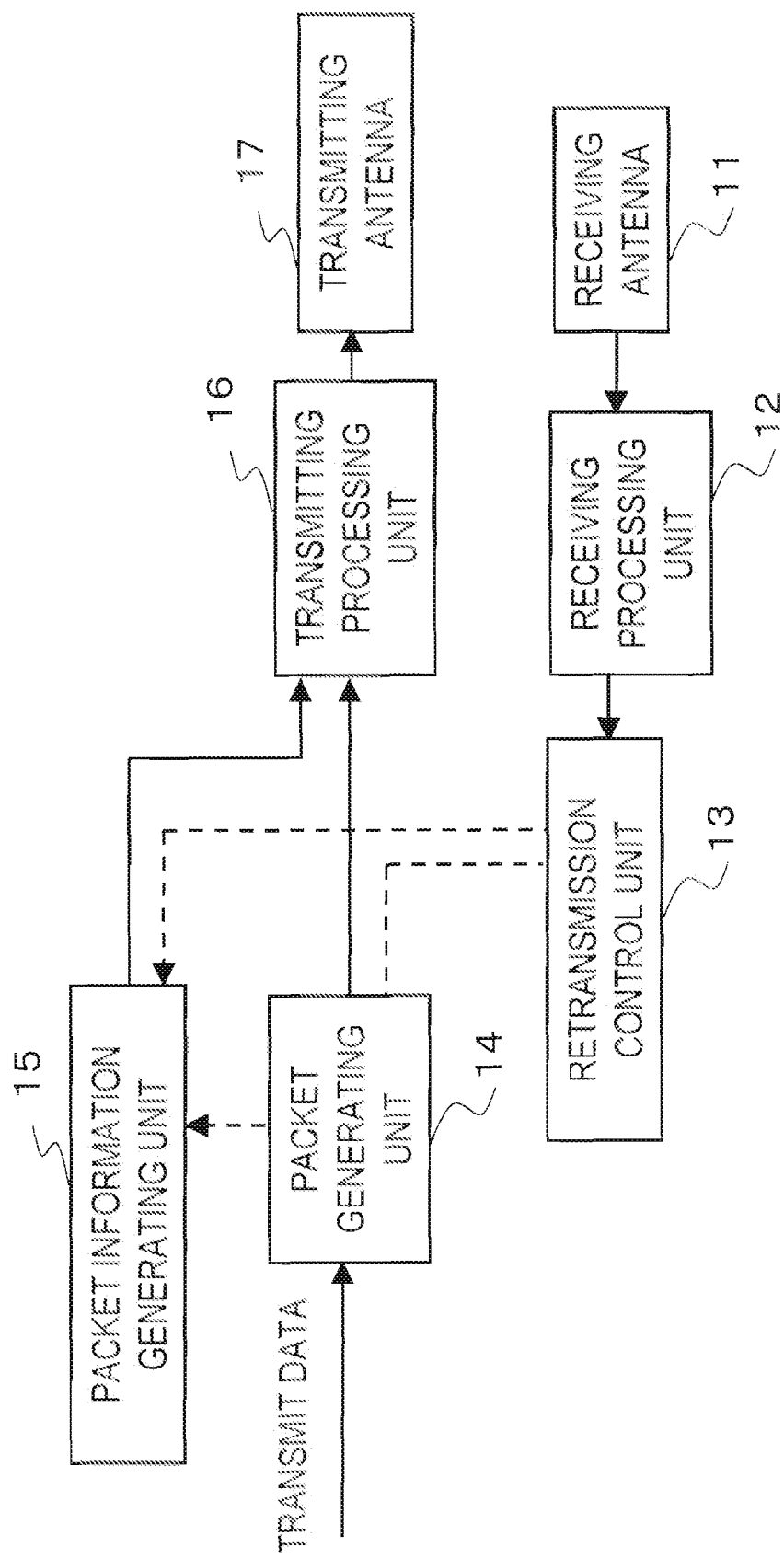
FIG. 8 illustrates a first example of a configuration of a transmitting apparatus.

FIG. 8 shows a first example of a configuration of the transmitting apparatus.

Numeral 11 indicates a receiving antenna. Numeral 12 indicates a receiving processing unit. Numeral 13 indicates a retransmission control unit. Numeral 14 indicates a packet generating unit. Numeral 15 indicates a packet information generating unit. Numeral 16 indicates a transmitting processing unit. Numeral 17 indicates a transmitting antenna.

The receiving antenna 11 receives various signals (e.g., ACK signals and NACK signals) transmitted from the receiving apparatus. The receiving processing is performed on the signals received by the receiving antenna by the receiving processing unit 12 depending on the transmission forms used for the transmission in order to obtain the receive data by demodulating and decoding (error correcting decoding may be included). The receiving data (e.g., an ACK signal and a NACK signal) obtained by the receiving processing unit 12 is given to the retransmission control unit 13.

After the new transmission (non-retransmission) (the transmission performed at the predetermined interval), the retransmission control unit 13 performs the retransmission control when neither ACK nor NACK signal is received at the timing of receiving the response signal (the ACK signal/the NACK signal).

That is, retransmit data is generated based on the transmit data stored in the packet generating unit 14 and is transmitted from the transmitting processing unit 16 and the transmitting antenna 17.

In this example, the information about the packet form transmitted from the packet generating unit 14 is given to the packet information generating unit 15. Then a transmission parameter (information such as a packet size, an encoding method, a modulating method, and a MIMO (applied/not applied)) is generated by the packet information generating unit 15. In advance of the packet transmission, the transmission parameter is transmitted as advance information (including a notice of transmission performed to a certain receiving apparatus) from the transmitting processing unit 16 and the transmitting antenna 17.

When the modulating method is changed by changing the transmission parameter, the modulating method is informed to the transmitting processing unit 16, and the transmitting processing unit 16 transmits the packet in accordance with the informed modulating method.

The transmitting antenna and the receiving antenna can be a shared antenna by using a duplexer or the like.

In this case, the retransmission control unit 13 performs the retransmission in response to the first transmission (the new transmission) when the ACK signal is not received (including the case when the NACK signal is received). However, after $N^{th}$ transmission (including the $N^{th}$ transmission), the retransmission control unit 13 does not perform the retransmission unless the NACK signal is received. In this case, the number N can be a predetermined value which is 2 or greater. However, the number N can be less than the maximum retransmission number (such as the maximum retransmission number-1).

Figure 9:
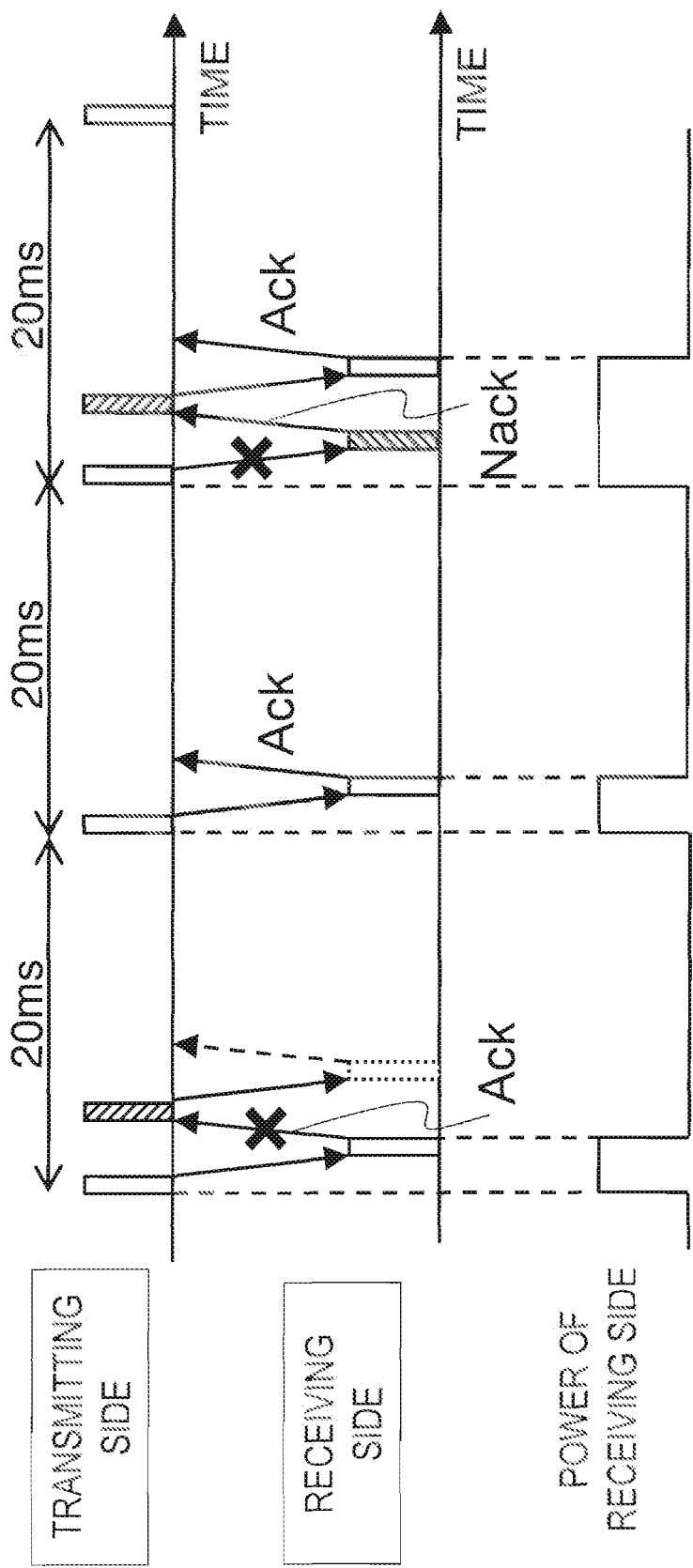
FIG. 9 illustrates a first example of transmitting processing.

FIG. 9 shows a first example of this transmitting/receiving processing.

As shown in FIG. 9, the retransmission control unit 13 performs the retransmission control when the transmitting apparatus could not detect the ACK signal (at the predetermined timing of receiving response signals) or detect the NACK signal incorrectly even though the first (the new) transmission of the packet data was successful and the receiving apparatus transmitted the ACK signal.

However, since the receiving apparatus transmitted the ACK signal, the receiving apparatus does not perform the reception operation of the retransmit packet (turns off the power of the receiving processing unit or search other transmitting apparatus) and does not transmit the response signal either.

Therefore, the transmitting apparatus does not receive the ACK signal or the NACK signal at the timing of receiving the response signal in response to the retransmission. Then, if the transmitting apparatus does not receive the NACK signal, the retransmission control unit 13 of the transmitting apparatus controls the transmitting apparatus not to perform the retransmission.

Figure 10:
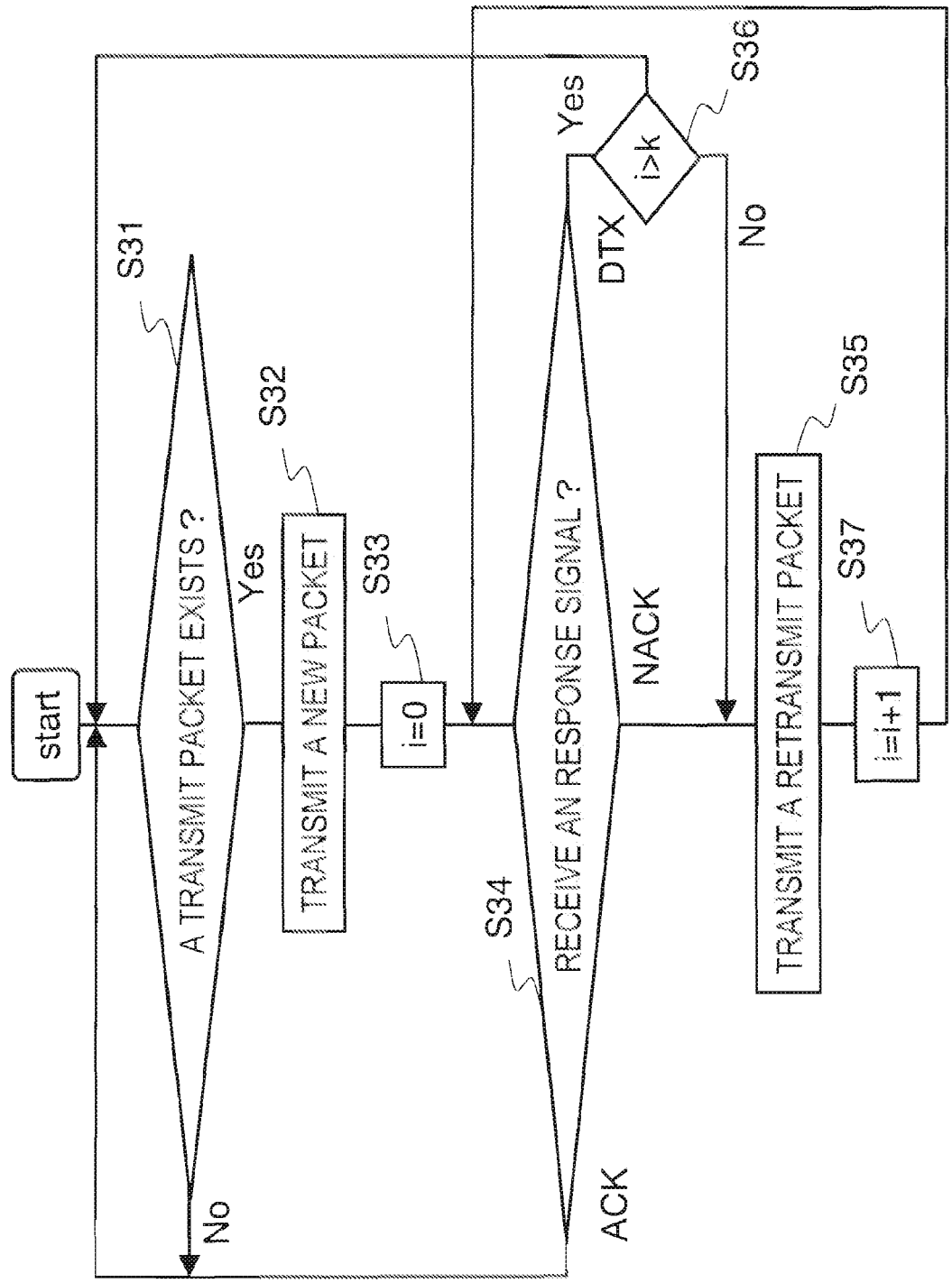
FIG. 10 illustrates an example of a control flow in the transmitting apparatus.

FIG. 10 shows a first example of a control flow in the transmitting apparatus. This control is performed mainly by the control of the retransmission control unit 13.

The transmitting apparatus (the retransmission control unit 13) determines whether or not there is a transmit packet which should be transmitted (step S31).

If NO in step S31, the process goes back to step S31. If YES in step S31, the packet generating unit 14 gives the transmit packet to the transmitting processing unit 16 in order to transmit a new packet (step S32) and transmits the packet from the transmitting antenna 17. In advance of the packet transmission, transmission parameter information is generated by the packet information generating unit 15 and is also transmitted to the receiving apparatus from the transmitting processing unit 16 and the transmitting antenna 17.

Then the retransmission control unit 13 sets a value i of a transmission counter to 0 (Step S33). The counter may be provided in the retransmission control unit 13.

Next, the retransmission control unit 13 determines whether or not the response signal is received. If the ACK signal is received, the process goes back to step S31. Then it is determined whether or not there is the next transmit packet.

On the other hand, if the NACK signal is received as the response signal, the retransmission control unit 13 controls the transmitting apparatus to retransmit the packet (step S35) and increments the value i of the counter by only one. Then the process goes back to the determination of step S34.

In the determination of step S34, it is determined that DTX (no response) is indicated if no ACK signal or no NACK signal is detected as the response signal. Then it is determined whether or not the value i of the counter is greater than a predetermined value k (step S36). The value k is a counting number which is 2 or greater than 2 and may be less than the maximum retransmission number.

In step S36, if the setting value of the counter is greater than the value k, the retransmission control unit 13 does not perform retransmitting processing. The process goes back to step S31 and the retransmission control unit 13 transmits the next new packet.

On the other hand, if the setting value of the counter is less than the value k in step S36, the retransmission control unit 13 transmits the retransmit packet (step S35) and increments the value i of the counter by only one. Then the process goes back to step S34.

This makes it possible to reduce the useless retransmissions even if there is a recognition difference of the reception result between the transmitting apparatus and the receiving apparatus.

Figure 11:
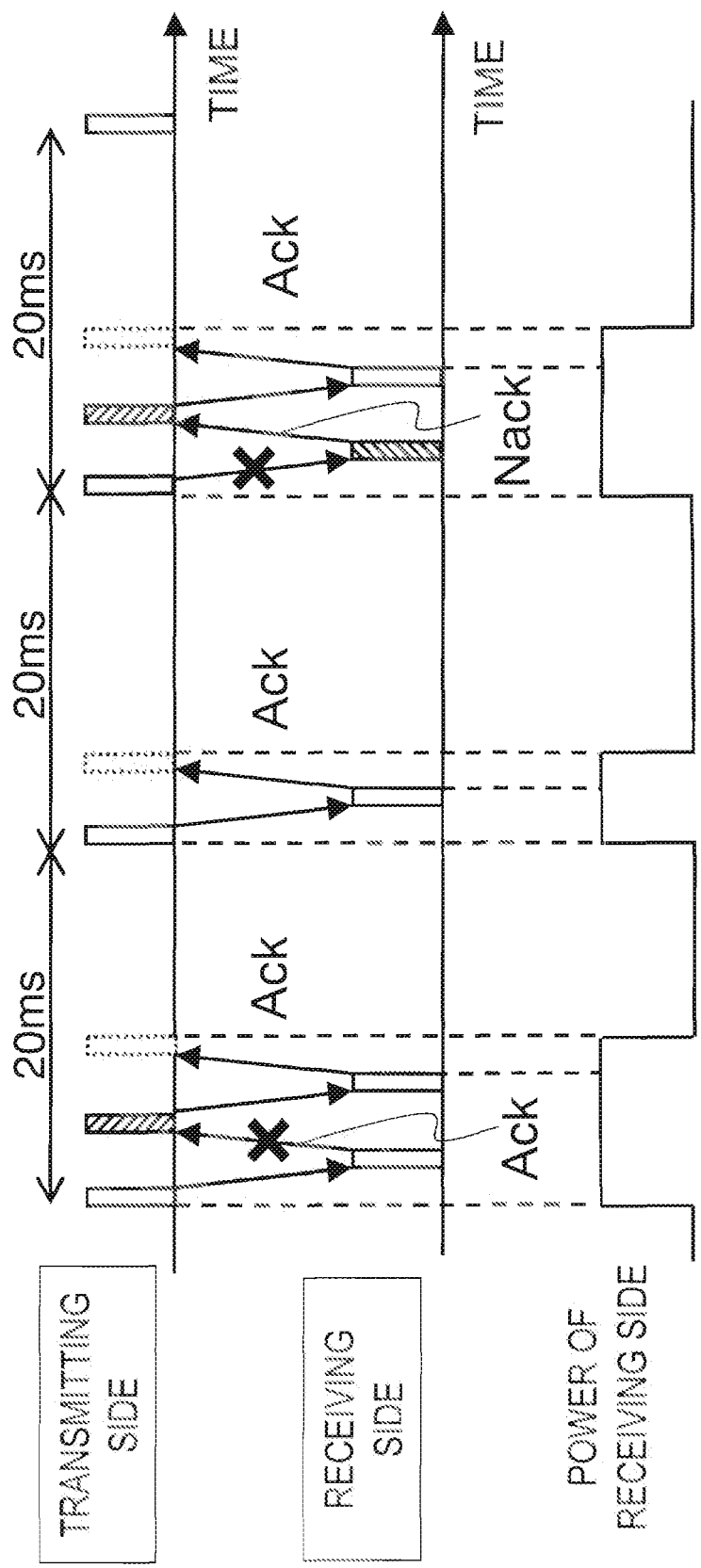
FIG. 11 illustrates a second example of transmitting processing.

Next, FIG. 11 shows a second example of this transmitting/receiving processing.

As described in FIG. 11, the retransmission control unit 13 performs the retransmission control when the transmitting apparatus could not detect the ACK signal (at the timing of receiving the predetermined response signal) or detect the NACK signal incorrectly even though the first (the new) transmission of the packet data was successful and the receiving apparatus transmitted the ACK signal.

An accidental case is considered in which that the transmitting apparatus can not detect the ACK signal even though the receiving apparatus transmits the ACK signal. Thus, it is determined whether or not the retransmit packet is transmitted. At this time, the determination can be performed by checking for an advance notice of retransmission transmitted from the packet information generating unit 15 or by actually attempting to receive the retransmitted packet.

If it is detected that the retransmission is not performed, the receiving apparatus turns off the power of the receiving unit or the search of other transmitting apparatuses is performed.

On the other hand, if it is detected that the retransmission is performed even though the transmitting apparatus transmitted the ACK signal, the receiving apparatus transmits the ACK signal regardless of whether or not the retransmit packet was received successfully. This is because since a successful reception has already been completed with respect to the packet, another retransmission is not necessary.

Therefore, because this ACK signal is received by the transmitting apparatus, the retransmission control unit 13 of the transmitting apparatus is controlled not to perform another retransmission.

Figure 12:
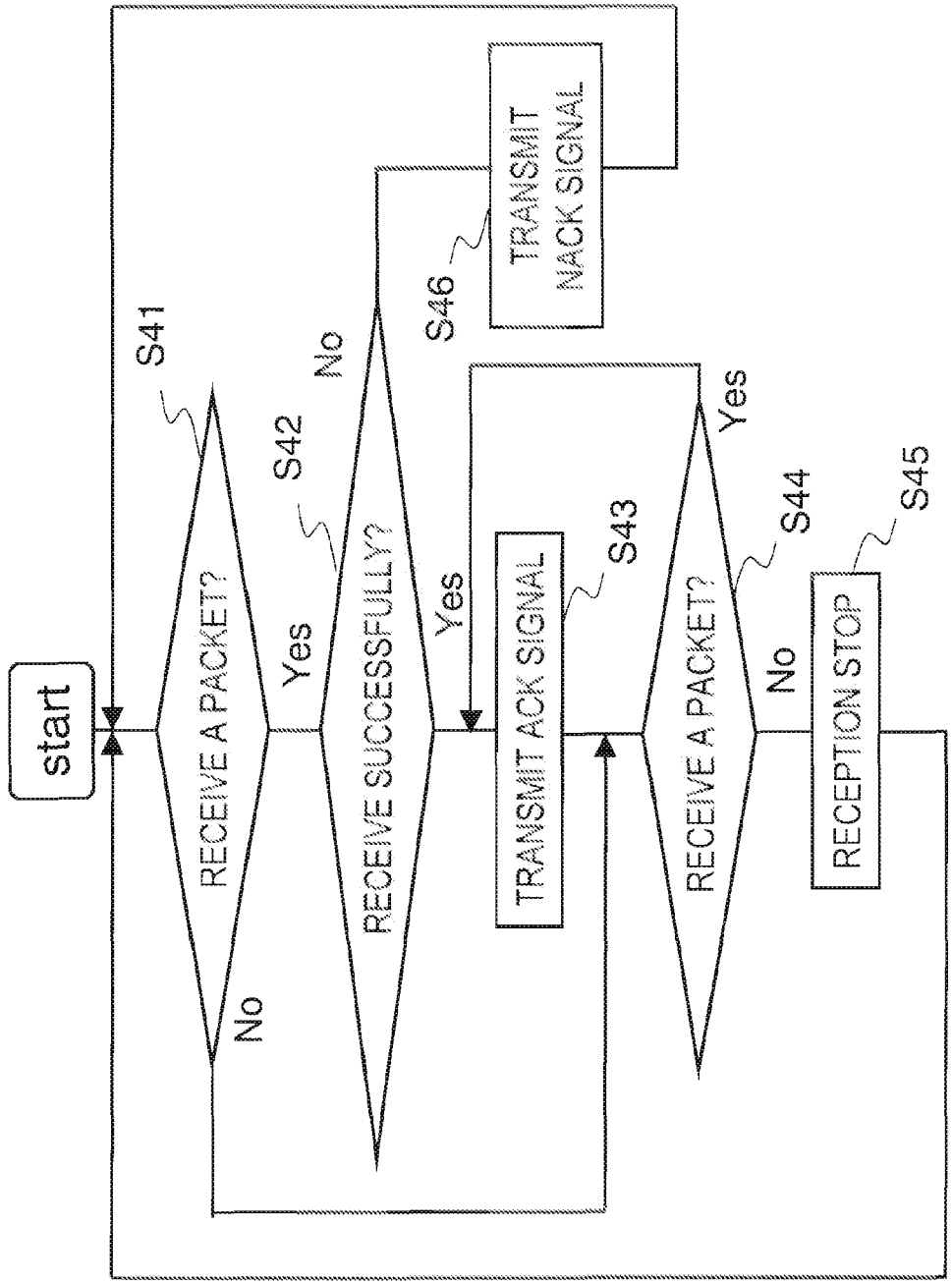
FIG. 12 illustrates an example of a control flow in the receiving apparatus.

FIG. 12 shows a first example of a control flow within the receiving apparatus. This control is performed mainly by the control of the reception control unit 4. That is, the receiving apparatus having the configuration shown in FIG. 4 is applicable.

The transmitting/receiving apparatus (the reception control unit 4) controls to start the reception operation at the transmit timing for transmitting a new packet in response to the predetermined interval and determines whether or not the packet is received (step S41).

If the packet is received in step S41, the reception result determining unit 3 determines whether or not the packet is successfully received (step S42).

If the packet is successfully received, an ACK signal is generated by the ACK/NACK signal generating unit 6 and the ACK signal is transmitted from the transmitting processing unit 7 and the transmitting antenna 8 (step S43).

If the packet is not successfully received, on the other hand, a NACK signal is generated by ACK/NACK signal generating unit 6 and the NACK signal is transmitted from the transmitting processing unit 7 and the transmitting antenna 8 (step S46). The reception control unit 4 puts the receiving processing unit 2 etc. in the reception standby state without turning off the power thereof, or the like, in order to receive the retransmit packet. After that, the process goes back to the determination of step S41.

If an ACK signal is transmitted in step S43, the reception control unit 4 determines whether or not the retransmit packet is received (step S44). In this step, if the transmitting processing of the retransmit packet is not performed (if the advance notice of transmission is not received or if the transmit packet is not actually received), the receiving processing of the packet data is stopped (step S45). As the stop of the receiving processing of the packet data, for example, the power of the receiving processing unit 2 or the like is turned off or the search of other transmitting apparatuses is performed.

Then the reception control unit 4 controls the receiving processing unit 2 or the like at the next transmit timing to receive the next packet. Then the process goes back to the determination of step S41.

In step S44, if it is detected that the transmitting processing of the transmit packet is performed even though an ACK signal is transmitted, the process goes back to step S43. Then the ACK signal is transmitted in order to control the transmitting apparatus not to perform another retransmission.

Going back to step S43 from step S44 can be limited to only one time. Also, it is allowed to follow the route to go back to step S43 from step S44 until the predetermined value N is reached. In this case, the predetermined value N may be less than the maximum retransmission number-1.

According to the embodiments, it is possible to reduce waste in the reception operation and the transmission operation when retransmissions occur out of the predetermined interval because of the retransmission control.

Although the embodiments of the present invention has been described in detail, it should be understood that the various changes, substitutions, and alterations could be made hereto without departing from the spirit and scope of the invention.

What is claimed is:

1. A communication apparatus comprising:
   a receiver configured to perform receiving processing of data transmitted at each of a plurality of timings which comes every time a given interval elapses; and
   a controller, when data transmitted at a first timing is not successfully received, configured to perform a receiving processing on a retransmission of the data between a second timing and a third timing, and perform a control for providing a period in which any receiving processing on a retransmission of the data is not performed until the second timing, wherein
   the first timing being one of the plurality of timings;
   the second timing being one of the plurality of timings and subsequent to the first timing; and
   the third timing being a timing of a transmission of a signal indicating that the data is not successfully received.

2. A communication apparatus comprising:
   a receiver configured to perform receiving processing of data transmitted at each of a plurality of timings which comes every time a given interval elapses;
   a transmitter configured to transmit a first signal indicating that data is successfully received when the data transmitted at a first timing is successfully received; and
   a controller configured to transmit a second signal indicating that the data is successfully received, after the first signal is transmitted, when an advance notice of a retransmission of the data is received or an actual reception of the retransmission of the data is performed, and perform a control for providing a period in which any receiving processing on a retransmission of the data is not performed until a second timing, wherein
   the first timing being one of the plurality of timings; and
   the second timing being one of the plurality of timings and subsequent to the first timing.

3. A receiving method of a communication apparatus comprising:
   performing receiving processing of data transmitted at each of a plurality of timings which comes every time a given interval elapses;
   transmitting a first signal indicating that data is successfully received when the data transmitted at a first timing is successfully received; and
   transmitting a second signal indicating that the data is successfully received, after the first signal is transmitted, when an advance notice of a retransmission of the data is received or an actual reception of the retransmission of the data is performed, and performing a control for providing a period in which any receiving processing on a retransmission of the data is not performed until a second timing, wherein
   the first timing being one of the plurality of timings; and
   the second timing being one of the plurality of timings and subsequent to the first timing.

* * * * *